(No Model.)

R. C. SNOWDEN.
NUT LOCK.

No. 513,209.

Patented Jan. 23, 1894.

Attest:
E. P. Hough
Frank G. Grimes.

Inventor:
Robert C. Snowden
By Chas. J. Gooch
Attorney.

THE NATIONAL LITHOGRAPHING COMPANY,
WASHINGTON, D. C.

UNITED STATES PATENT OFFICE.

ROBERT C. SNOWDEN, OF DUQUESNE, PENNSYLVANIA.

NUT-LOCK.

SPECIFICATION forming part of Letters Patent No. 513,209, dated January 23, 1894.

Application filed February 10, 1893. Serial No. 461,836. (No model.)

*To all whom it may concern:*

Be it known that I, ROBERT C. SNOWDEN, a citizen of the United States, residing at Duquesne, in the county of Allegheny and State of Pennsylvania, have invented certain new and useful Improvements in Nut-Locks; and I do hereby declare the following to be a full, clear, and exact description of the invention, such as will enable others skilled in the art to which it appertains to make and use the same.

This invention relates to improvements, as hereinafter described, in nut-locks.

Figure 1:
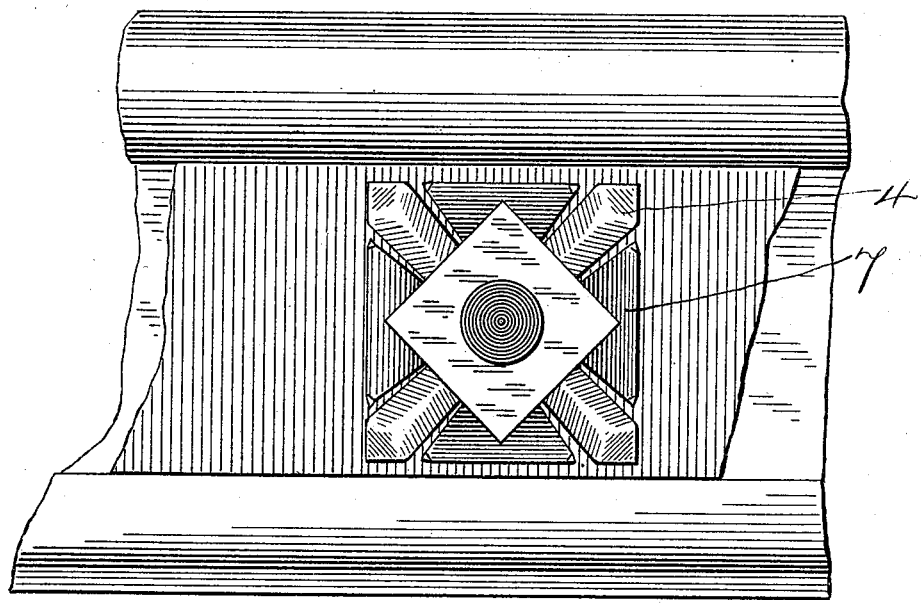
Figure 3:
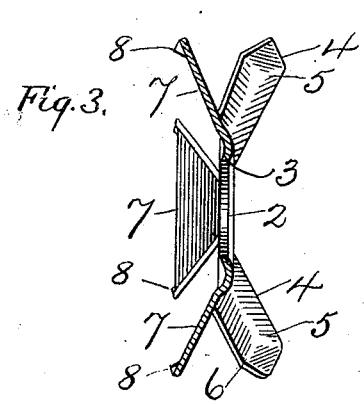
Figure 2:
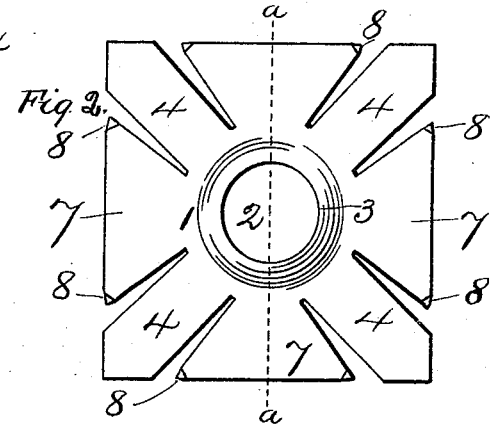
Figure 4:
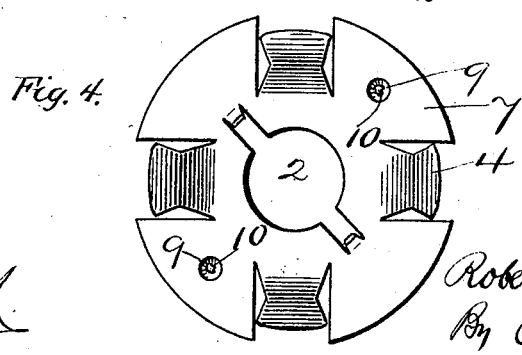

In the accompanying drawings, Figure 1 represents one of my improved nut-locks in use. Fig. 2 represents a top plan view of the nut-locking washer shown in Fig. 1. Fig. 3 represents a section taken on the line *a, a,* of Fig. 2. Fig. 4 represents, in top plan view, a modified form of a nut-locking washer in circular form.

My improved nut-lock, it will be observed on reference to the drawings, consists of a washer of heavy spring metal of either square, round, or other desired contour, provided with a series of outwardly-extending, or outwardly-flexed, lips struck up therefrom and having curved or rounded outer faces and inturned ends; mediately of said lips are wings which may be curved inwardly and have inwardly-curved corners to grip the material against which the lock-washer rests; around the central bolt hole is a bead or ring upon which the nut rests and turns.

Referring now to the drawings, 1 represents the body of the washer; in the illustration shown in Fig. 2, circumferentially around the bolt-receiving hole, 2, is a rounded bead or ring, 3, which serves as a bearing for and upon which the nut turns so as to relieve the body of the washer from undue compression of the nut and the consequent injury to the spring-like character of the washer; a washer of known construction (such, for instance as the ring washer customarily used in the arts in connection with nuts to receive the impact of the nut), may, if desired, be interposed between the lock washer and nut in the ordinary way in which such washers are now employed, but I make no claim herein thereto as such use of a washer located between the nut and the article to be gripped thereby is well known and in common use. At suitable distances apart around the periphery of the spring washer, according to the number of faces of the nut to be used in connection with said lock washer, are struck out a series of outwardly-flexed spring-lips, 4, said lips being formed in the striking-up operation with convex or rounded outer faces, 5, and with inwardly or downwardly-extending corners, 6. The object secured in thus curving said lips is that thereby not only will the spring-like action of said lips be increased but they will be more elastic in their operation as the nut passes over them and the nut will more easily ride over them, and the tendency of the nut, in screwing home, to press down said lips and injure their elasticity will be prevented. The function of these lips is to grip the sides of the nut and thereby lock the same and prevent its turning loose; as the nut passes over said lips they spring back into position between the corners of the nut and, gripping against its faces, thereby securely hold the nut from free movement, though at any time desired a track hand can by the simple use of a wrench turn the nut a quarter or an eighth or any other distance around to tighten it; similarly, by a wrench alone, the nut can readily be removed without injury to the spring lips. Mediately of said lips are wings, 7. In the form shown in Figs. 1, 2 and 3 the body of the lock-washer, and said wings also, are of inward curvature as shown whereby an increased spring-like cushioning effect is secured against the compression of the nut, the corners of the said wings, 7, being incurved or bent as shown at, 8, to serve, in connection with the incurved wings, as grips which, when the lock-washer is applied to penetrable articles, as wood, will bite into said article and hold the lock-washer from turning; when the lock-washer is used in connection with metal or hard surfaces, said inturned corners and edges will grip the same and frictionally hold the lock-washer in place.

Where the body, 1, and wings, 7, of the lock-washer are flat, as shown in Fig. 4, and it is desired to provide means for securing said washer to the article, holes, 9, may be punched therein, the punched-out metal in such case forming points or projections, 10, which are forced into the material against which the washer rests either by the pressure of the nut or by the direct blows of a hammer or other tool.

Having thus described my invention, what I claim is—

1. In a nut lock, a washer having a series of outwardly-extending spring lips and, mediately thereof, a series of inwardly-extending wings having inturned corners, substantially as and for the purpose set forth.

2. In a nut lock, a washer having a central bolt-hole, a bead or ring extending circumferentially around said bolt-hole, outwardly-extending spring lips and, mediately thereof, inwardly-extending spring lips, substantially as and for the purpose set forth.

3. In a nut-lock, a washer having radially-extending outwardly-flexed spring lips having the corners of their outer ends inturned, substantially as and for the purpose set forth.

4. In a nut-lock, a washer having a series of radially-extending outwardly-flexed spring lips and mediately thereof a series of inwardly-curved wings having the corners of their outer ends inturned, substantially as and for the purpose set forth.

In testimony whereof I affix my signature in presence of two witnesses.

ROBERT C. SNOWDEN.

Witnesses:
  D. R. WOOD,
  A. R. MAY.